(12) United States Patent
Mavinakuli et al.

(10) Patent No.: US 10,817,570 B2
(45) Date of Patent: Oct. 27, 2020

(54) HYBRID CONNECTIVITY FOR REPORTING APPLICATION

(71) Applicant: SAP SE, Walldorf (DE)

(72) Inventors: Prasanna Bhat Mavinakuli, Sagar Tq. (IN); Shanu Gupta, Gaya (IN); Nikita Jain, Bangalore (IN)

(73) Assignee: SAP SE, Walldorf (DE)

( * ) Notice: Subject to any disclaimer, the term of this patent is extended or adjusted under 35 U.S.C. 154(b) by 222 days.

(21) Appl. No.: 15/834,411

(22) Filed: Dec. 7, 2017

(65) Prior Publication Data

US 2019/0179972 A1 Jun. 13, 2019

(51) Int. Cl.
| | |
|---|---|
| *G06F 7/00* | (2006.01) |
| *G06F 17/00* | (2019.01) |
| *G06F 16/907* | (2019.01) |
| *G06F 16/904* | (2019.01) |
| *G06F 16/901* | (2019.01) |
| *G06F 16/248* | (2019.01) |

(52) U.S. Cl.
CPC ......... *G06F 16/907* (2019.01); *G06F 16/248* (2019.01); *G06F 16/904* (2019.01); *G06F 16/9024* (2019.01)

(58) Field of Classification Search
None
See application file for complete search history.

(56) References Cited

U.S. PATENT DOCUMENTS

| | | | |
|---|---|---|---|
| 2012/0023101 A1* | 1/2012 | Heimendinger | G06F 16/2457 707/737 |
| 2015/0186529 A1* | 7/2015 | Rope | G06Q 10/00 707/722 |
| 2015/0278214 A1* | 10/2015 | Anand | G06F 16/338 707/748 |
| 2015/0278371 A1* | 10/2015 | Anand | G06F 16/24578 707/723 |
| 2015/0346956 A1* | 12/2015 | Peters | G06F 3/0482 715/771 |
| 2016/0124960 A1* | 5/2016 | Moser | G06T 11/206 707/723 |
| 2016/0188598 A1* | 6/2016 | Moser | G06F 3/0482 707/723 |
| 2017/0039554 A1* | 2/2017 | Greifeneder | G06Q 20/389 |
| 2017/0091968 A1* | 3/2017 | George | G06T 11/206 |

* cited by examiner

*Primary Examiner* — Tuan A Pham
(74) *Attorney, Agent, or Firm* — Buckley, Maschoff & Talwalkar LLC (57) ABSTRACT

A system includes reception of a first user instruction to access a dataset stored in a data source, retrieval of metadata of the dataset from the data source in response to the first user instruction, the metadata defining a plurality of dimensions and measures associated with the dataset, reception of a second user instruction to associate a first one of the plurality of dimensions and measures with a first visualization, determination of a first one or more dimensions or measures associated with the first one of the plurality of dimensions and measures, retrieval, from the data source, of data of the dataset associated with the determined first one or more dimensions or measures and the first one of the plurality of dimensions and measures, updating of the first visualization based on the retrieved data, and display the updated first visualization on a display.

17 Claims, 7 Drawing Sheets

HYBRID CONNECTIVITY FOR REPORTING APPLICATION

BACKGROUND

Enterprise software systems receive, generate, and store data related to many aspects of an enterprise. Users operate client applications to access such data and present the data in useful formats, such as in graphic visualizations. For example, a conventional client application allows a user to build a visualization (e.g., a bar graph, a pie chart, a geomap) by specifying dimensions (e.g., Sales by Country) associated with axes of the visualization. The client application then fetches corresponding data from a data source and generates the visualization with the data.

The client application may support an "always-on" connection to the data source. Accordingly, any updates in the data source are directly reflected in visualizations presented by the client application. Upon opening a saved visualization, the client application fetches live data from the corresponding data source and generates the visualization. Such a connection may consume unacceptable amounts of time and bandwidth, since visualizations are generated and updated via continual data fetching. Moreover, such a connection prevents a user from manipulating the data because the data is tied to live data.

Offline connectivity involves storing the data locally to the client application and visualizing the stored data. The stored data may be visualized quickly and without the need for a connection to the remote data source. The data may also be manipulated without raising concerns of altering the data source. However, the data is stale and becomes more stale as time passes. Downloading and locally storing the data, which may comprise millions of rows, may also place unsuitable demands on the hardware capabilities and performance of the local computing system.

DETAILED DESCRIPTION

The following description is provided to enable any person in the art to make and use the described embodiments. Various modifications, however, will remain readily apparent to those in the art.

Generally, according to some embodiments, a client application fetches dataset metadata upon connection to a remote data source. Dataset data is fetched only when a user associates a dimension of the metadata with a visualization axis. According to some embodiments, the metadata of the dataset is stored in a local cache and may be manipulated within the cache, for example to define a new calculated column.

To save a visualization, a document including the metadata thereof is saved in the local cache. On opening the document, the metadata is refreshed and the corresponding data is fetched from the data source to populate the visualization.

Figure 1:
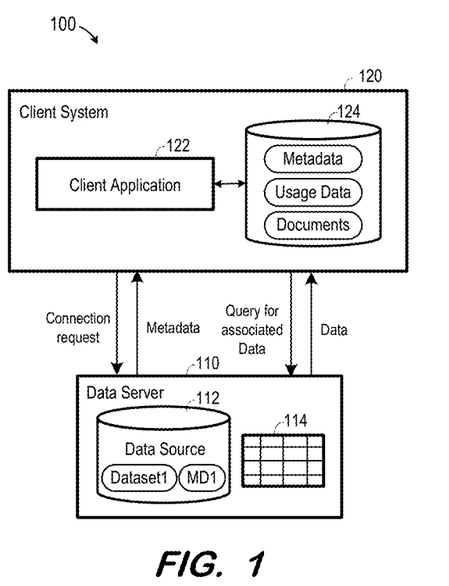
FIG. 1 is a block diagram of a system architecture according to some embodiments.

FIG. 1 is a block diagram of system 100 according to some embodiments. Embodiments are not limited to the FIG. 1 system. System 100 includes data server 110 and client system 120. Data server 110 and client system 120 may communicate over any number of intermediate public or private networks, including but not limited to the World Wide Web.

Client system 120 executes client application 122 to generate and display data visualizations. For example, client system 120 may execute client application 122 to present a user interface to a user on a display of client system 120. Initially, the user operates the user interface to send a connection request to data server 110. The connection request may comprise a request to connect to dataset Dataset1 of data source 112.

According to some embodiments, data server 110 returns metadata MD1 associated with Dataset1 to client system 120 in response to the connection request. Metadata MD1 may define objects which are mapped to logical entities of Dataset1. Each object associates one or more physical entities (e.g., a physical data table, associated columns of one or more data tables, etc.) of one or more data sources with user-friendly names. These objects may be classified as dimensions, along which one may want to perform an analysis or report (e.g., Year, Country, Product) or measures (e.g., Sales, Profit), whose values can be determined for a given combination of dimension values.

Client system 120 may store the received metadata in local cache 124. Local cache 124 may comprise local storage of client system 120, such as but not limited to Flash memory, a fixed disk drive, and volatile or non-volatile Random Access Memory.

A user may operate client application 122 to define a visualization based on a combination of one or more measures, dimensions, dimension values and/or filters defined by the metadata of local cache 124. Client application 122 may provide any suitable user interface metaphor to define a visualization that is or becomes known. For example, client application 122 may allow a user to define one or more dimensions per visualization axis and one or more measures to be determined based on the axes, using selectable checkboxes, multi-selection drop-down boxes, a drag-and-drop interface and/or other metaphors.

As will be described in detail below, the association of a particular dimension with a visualization causes client system 120 to transmit a query for associated data to data server 112. The query may request data of the particular dimension, as well as of measures and/or dimensions which are associated with the particular dimension. The associated measures and dimensions may be determined based on usage data also stored in local cache 124. The usage data, as will be described below, may indicate known associations between measures and dimensions based at least in part on associations indicated through user usage of client application 122.

By preloading selected data of the dataset based on user actions, some embodiments may provide responsive performance while avoiding bandwidth and storage issues which would be caused by preloading all the data of the dataset.

A generated visualization may be stored within a document of local cache 124. According to some embodiments, the document stores metadata defining the visualization but does not store the data referenced by the metadata. Upon opening a document, client application 122 generates one or more visualizations defined therein and queries data server 110 for data to populate the visualizations. The visualizations thereby present current data.

Some embodiments support manipulation of the metadata within local cache 124. Such manipulation may include defining a new column based on data of two or more existing dataset columns. The new column may be associated with a visualization which is stored within a document of local cache 124. Such a document includes the definition of the new column as well as of the visualization, thereby enabling client application 122 to re-generate the visualization and populate the visualization with appropriate data from data server 110 based on the stored document.

Client system 120 may comprise any suitable computing device capable of executing client application 122 and maintaining local cache 124. Local cache 124 may comprise an in-memory database managed by a process separate from client application 122 according to some embodiments. Client system 120 may comprise, for example, a desktop computer, a laptop computer, a tablet computer, or a smartphone. Client application 122 may comprise a data intelligence application which facilitates data visualization and analysis, but embodiments are not limited thereto.

Data server 110 may also comprise any query-responsive data server that is or become known, including but not limited to a structured-query language (SQL) relational database management system. Data server 110 may comprise any one or more data sources which are or become known, including but not limited to database views, spreadsheets, relational databases and/or OnLine Analytical Processing cubes. The data sources of data server 110 may be distributed among several relational databases, dimensional databases, and/or other data sources. Embodiments are not limited to any number or types of data sources.

In some embodiments, data source 112 may comprise one or more of conventional tabular data, row-based data, column-based data, and object-based data. Moreover, the data may be indexed and/or selectively replicated in an index to allow fast searching and retrieval thereof. Data server 110 may support multi-tenancy to separately support multiple unrelated clients by providing multiple logical database systems which are programmatically isolated from one another.

Data source 112 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database). A hardware processing system implementing database server 110 (e.g., a server blade) may be physically integrated with or separate from a hardware storage system (e.g., a fixed disk array, volatile Random Access Memory) implementing data source 112.

Figure 2:
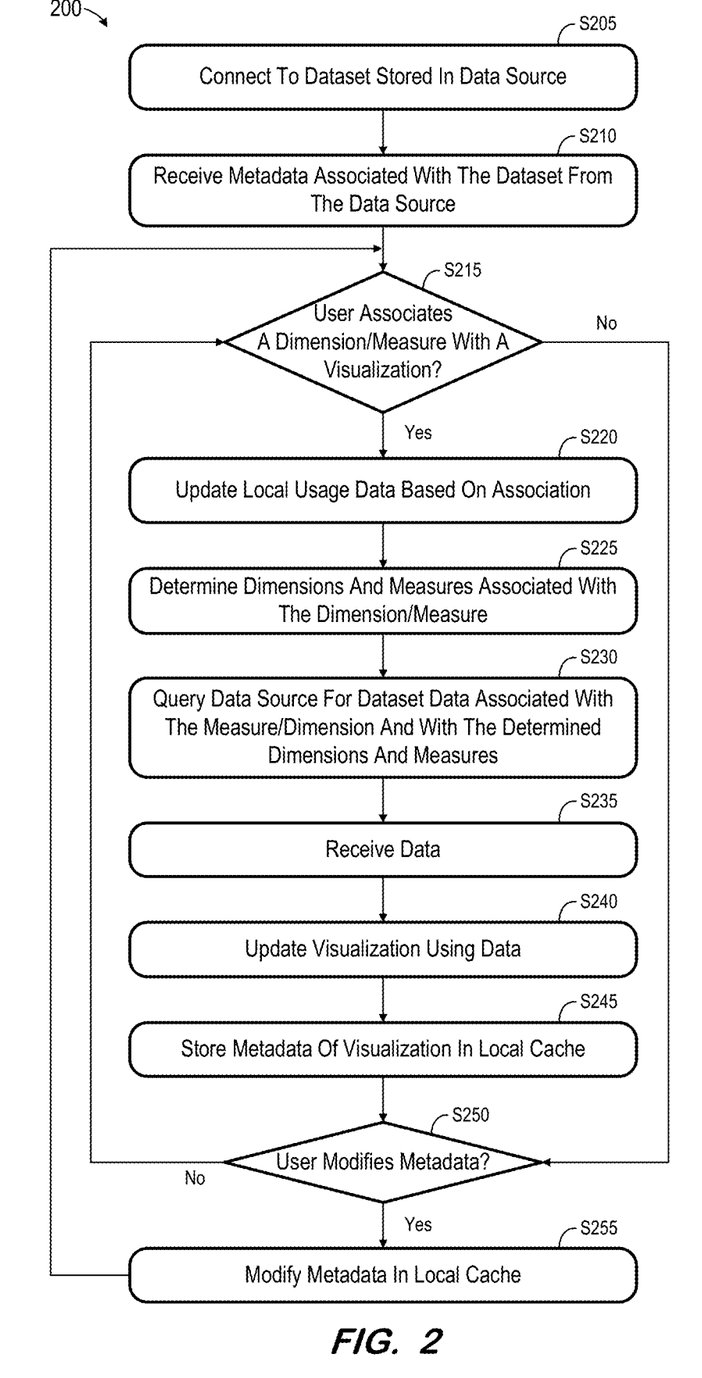
FIG. 2 is a flow diagram of a process according to some embodiments.

FIG. 2 comprises a flow diagram of process 200 to according to some embodiments. In some embodiments, various hardware elements of system 100 execute program code to perform process 200. Process 200 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Figure 3:
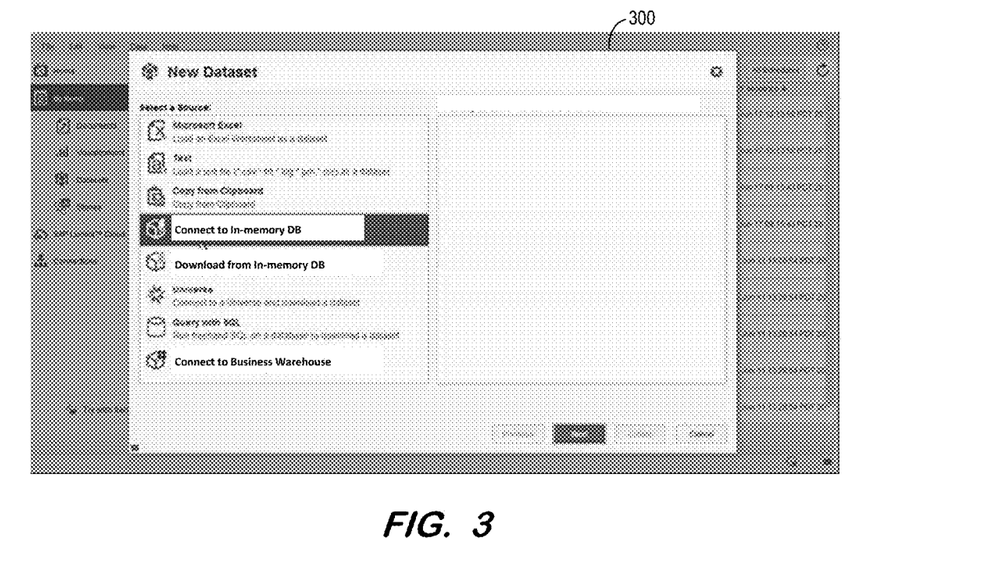
FIG. 3 is a user interface for selecting a data source according to some embodiments.

Prior to process 200, it will be assumed that a client application is executed on a client system. The client application provides an interface allowing a user to select a data source. FIG. 3 is a view of user interface 300 according to some embodiments. Client system 120 may execute client application 122 to display user interface 300 on a display of client system 120. User interface 300 lists several types of data sources to which client application 122 may connect. Embodiments are not limited to the user interfaces described herein.

Figure 4:
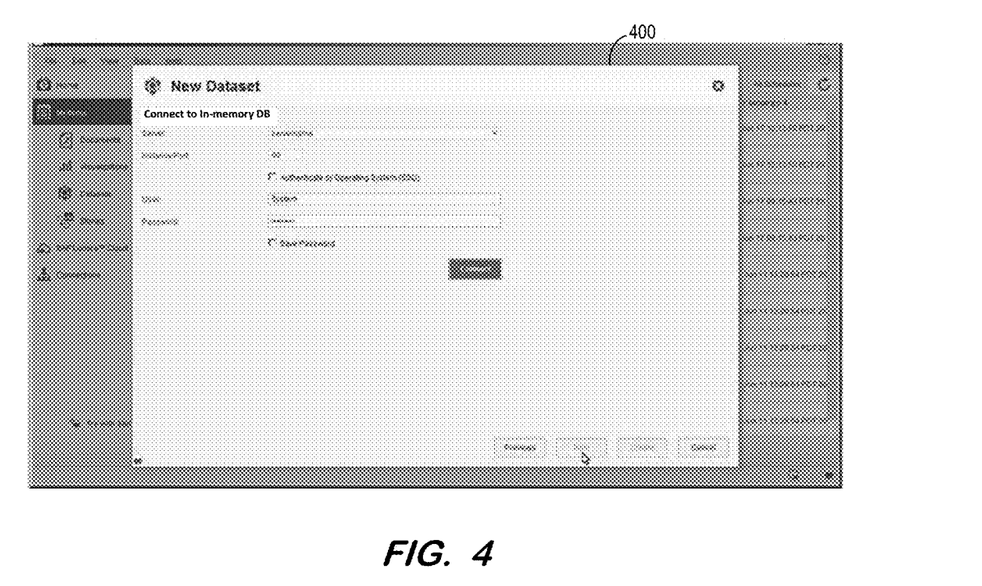
FIG. 4 is a user interface for providing data source connection credentials according to some embodiments.

A connection to a dataset of data source is established at S205. In the present example it will be assumed that the user selects "Connect to In-memory DB", although embodiments are not limited thereto. FIG. 4 illustrates user interface 400 for inputting credentials for connecting to the selected data source. The credentials are input and transmitted to the data source for authorization.

Figure 5:
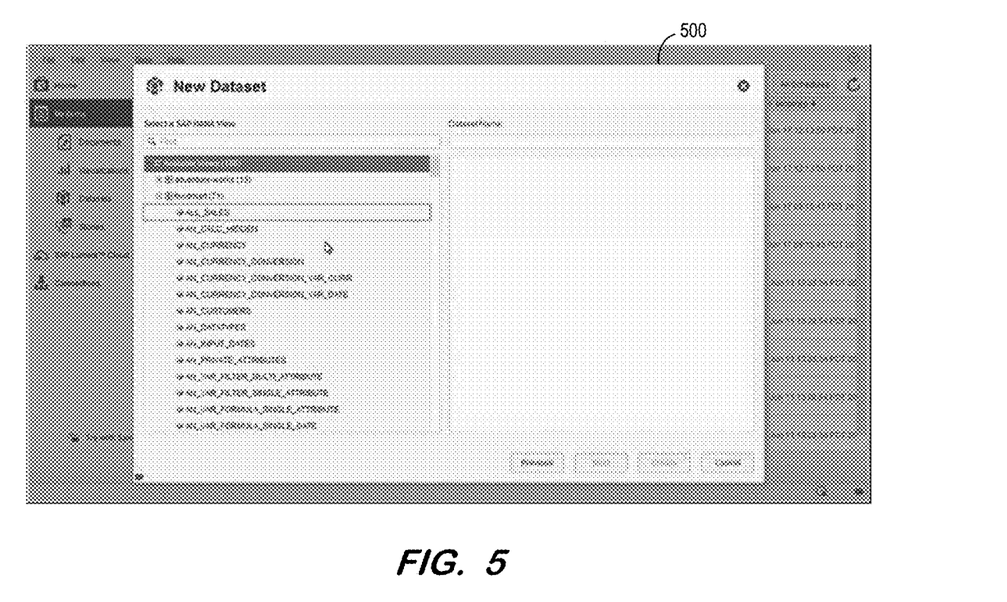
FIG. 5 is a user interface for selecting a dataset according to some embodiments.

After successful connection to the data source, the data source provides the client application with a list of accessible data sources. FIG. 5 is a view of user interface 500 listing the datasets of the data source according to some embodiments. The datasets of FIG. 5 comprise database views. As is known in the art, views span one or more database tables and include columns deemed by a view designer to be logically-related to one another. Views allow a user to define useful visualizations without exposing the user to an overwhelming number of table columns.

A dataset is selected at S205. Next, at S210, the client application receives metadata associated with the selected dataset from the data source. Accordingly, a dataset should be associated with metadata defining the structure and relationships of the data thereof. The metadata may consist of explicit stored values (e.g., in a database schema file) and/or implicit values which may be determined from the data of the dataset (e.g., column values). The metadata may comprise names of the dimensions and measures of the dataset, as well as any other suitable metadata such as data type, cardinality value, key relationships, etc. According to some embodiments, no actual data (e.g., table rows) are received at S210.

At S215, it is determined whether the user has associated a dimension of the metadata with a visualization. In this regard, after reception of the metadata at S210, the user may be presented with an interface for defining a visualization. The interface may present the metadata received at S210 in a manner which facilitates association of the dimensions or measures with an axis or other characteristic (e.g., color, shape) of a visualization.

Figure 6:
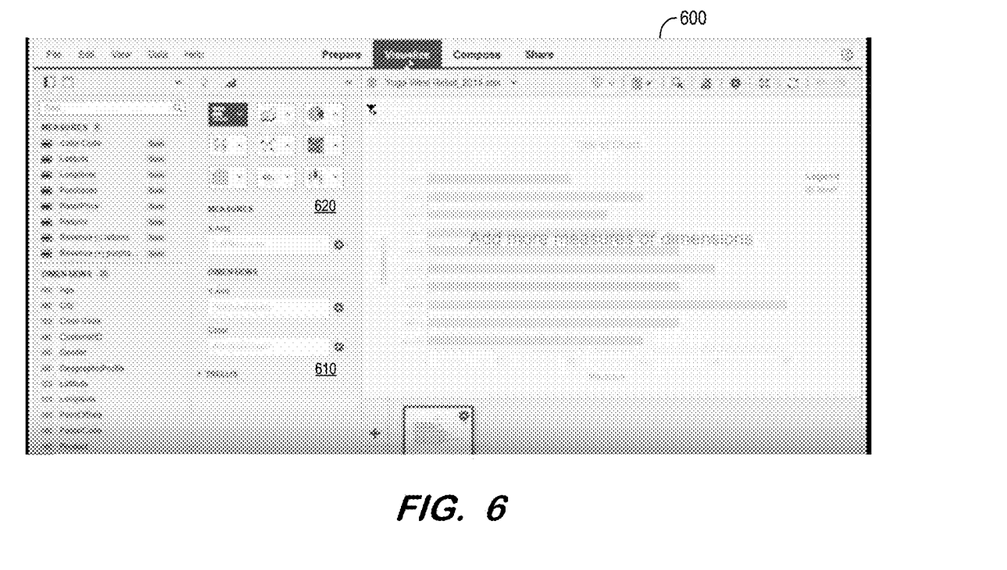
FIG. 6 is a user interface for associating dimensions with a visualization according to some embodiments.

FIG. 6 is a view of user interface 600 for defining a visualization based on received metadata of a dataset at S215. The left side of interface 600 lists measures and dimensions of the selected dataset. Area 610 allows a user to specify one or more dimensions or measures to associate with each axis of a visualization, and area 620 allows a user to specify a visualization type.

Figure 7:
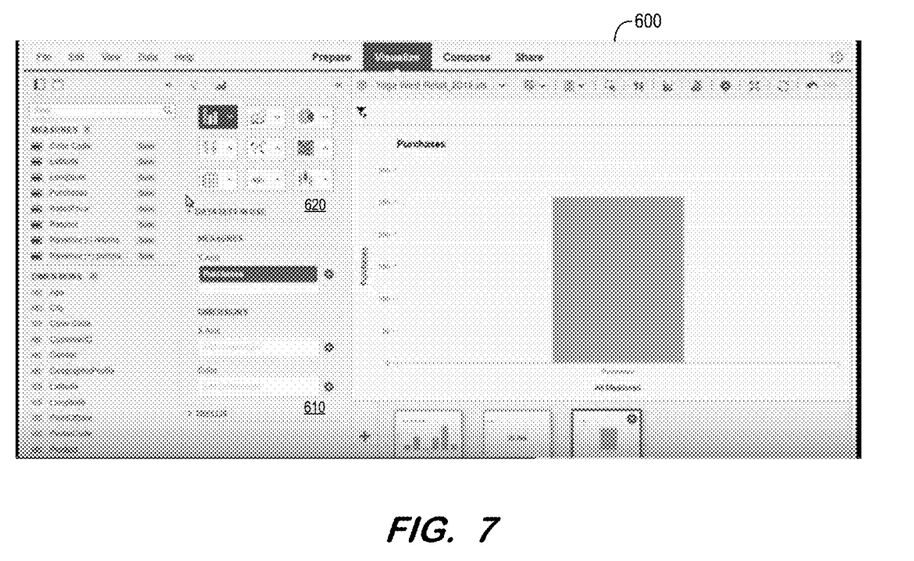
FIG. 7 is a user interface illustrating the association of a first dimension with a visualization according to some embodiments.

FIG. 7 illustrates user interface 600 after selection of a bar graph visualization in area 620, and association of a Purchases measure with the Y axis of the visualization. Flow proceeds from S215 to S220 in response to association of the Purchases measure with the visualization.

At S220, local usage data are updated based on the association of the Purchases measure with the visualization. The local usage data may be stored in local cache 124, and may specify the selected dataset, visualization and dimension. At S225, the usage data is used to determine dimensions and measures which are associated with the selected measure.

For example, the metadata received at S210 may indicate associations between dataset dimensions and measures. Upon receipt of metadata at S210, the client application may generate a repository of associated columns based on this metadata. The associated dimensions and measures may be determined at S225 based on this repository.

The associated dimensions and measures may be alternatively or also determined at S225 based on the aforementioned local usage data. The usage data may indicate different dimensions and measures which were previously used by the user within visualizations. The usage data may also indicate which dimensions and measures were used within a same visualization and may also identify the visualization types in which certain combinations of dimensions and measures were used.

Scores may be determined for each other dimensions and measure specified in the metadata based on the local usage data and/or the repository of associated columns. A score indicates the degree to which a dimension or measure is likely to be used in conjunction with the selected dimension in the selected visualization. Embodiments may employ any suitable system for determining the score. The dimensions and measures determined at S225 may be those having a score exceeding a certain threshold, those having one of the top x number of scores, or any other set of dimensions and measures.

At S230, the data source is queried for data of the dataset which is associated with the selected dimension/measure and with each of the determined dimensions and measures. This data is received at S235. S230 and S235 are intended to retrieve data which may be needed to populate the selected visualization. For example, data for the Product dimension may also be received at S235. Notably, the entire dataset is not retrieved, reducing the bandwidth and storage demands on the client system.

The visualization is updated using the data at S240. FIG. 7 illustrates such an updated visualization according to some embodiments. As shown, data for the selected measure has been retrieved and represented in the visualization.

Metadata of the visualization is stored in the local cache at S245. As mentioned above, the local cache may be managed by a process separate from the client application, and may reside-in memory according to some embodiments. It will be assumed that the user now associates a next dimension/measure with the visualization, causing flow to proceed through S250 and S215, and to S220.

Figure 8:
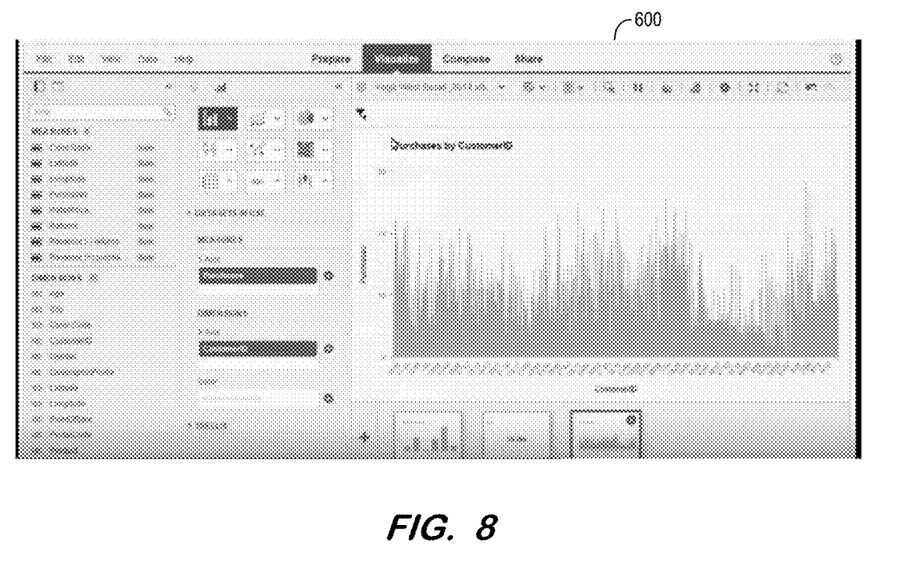
FIG. 8 is a user interface illustrating the association of a second dimension with a visualization according to some embodiments.

FIG. 8 illustrates association of a second dimension with the visualization of the present example. As shown, the dimension CustomerID is now associated with the X-axis of the visualization. Flow then proceeds as described above to update the local usage data, determine dimensions and measures associated with the newly-associated dimension, query for and receive data associated with the newly-associated dimension and the determined dimensions and measures, and update and store the visualization.

In some embodiments, the determination of the associated dimensions and measures is based on all dimensions and/or measures which have been thus far associated with the visualization. The accuracy of such a determination in identifying relevant dimensions and/or measures may increase as dimensions and/or measures are added to the visualization, as the intent of the visualization becomes clearer.

In some embodiments, one or more of the associated dimensions and measures determined at S230 may have previously been determined at S230. Accordingly, the data for such dimensions and/or measures is not queried for or received at S230/S235, because the data thereof has already been received.

The user may continue to add dimensions and/or measures to the visualization, causing flow to cycle between S210 and S250 as described above. In some embodiments, the user may further manipulate user interface 600 to modify the metadata of the dataset. For example, the user may define a new column based on the values of two existing columns (e.g., Column C=Column A+Column B), and use the new column in the visualization. Flow proceeds from S250 to S255 if it is determined that the user has modified the metadata of the dataset. At S255, the metadata of the local cache is updated based on the user modification (e.g., to define the new column).

The user may further operate the client application to save the visualization. In order to save the visualization, a document is created including metadata defining the visualization. The document does not store the actual data (e.g., dataset rows) presented by the visualization. Upon opening the document, the data source is accessed using connection credentials specified in the document, and data corresponding to the metadata of the visualization are retrieved. The visualization is generated and populated based on the metadata of the document and the received data, and flow proceeds from S215 as described above.

Figure 9:
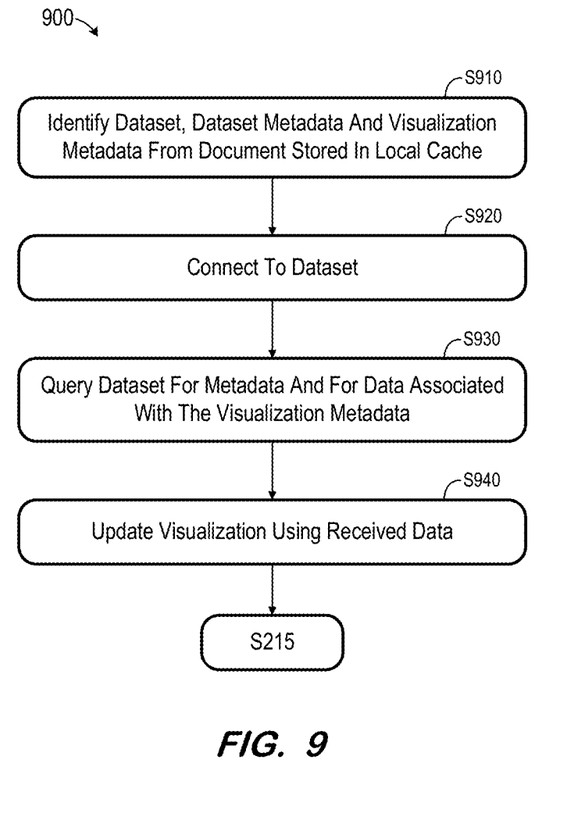
FIG. 9 is a flow diagram of a process to open a stored document according to some embodiments.

FIG. 9 illustrates process 900 to open a document saved in the local cache as described above. Initially, at S910, the client application opens a document stored in the local cache. The client application identifies a dataset, dataset metadata and visualization metadata stored in the document.

Next, at S920, the client application connects to the dataset. The document may include connection credentials, or the user may be prompter for the connection credentials. The dataset is queried at S930 for its metadata and for the data associated with the visualization metadata. The visualization is updated at S940 based on the received data.

Flow then proceeds to S215 and continues as described above. For example, the user may add measures or dimensions to the visualization based on the received dataset metadata, prompting the client application to retrieve corresponding data from the dataset and update the visualization accordingly. Any updates to the visualization metadata may be saved in the same or a new document of the local cache. Accordingly, some embodiments provide efficient rendering of a saved visualization without requiring saving of the data presented by the visualization.

A visualization according to some embodiments may comprise any graphic for presenting data, and may be defined using any suitable system that is or becomes known. According to some embodiments, one or more visualizations may be defined within a container (e.g., a page), and one or more pages may be defined in a container (e.g., a story).

Figure 10:
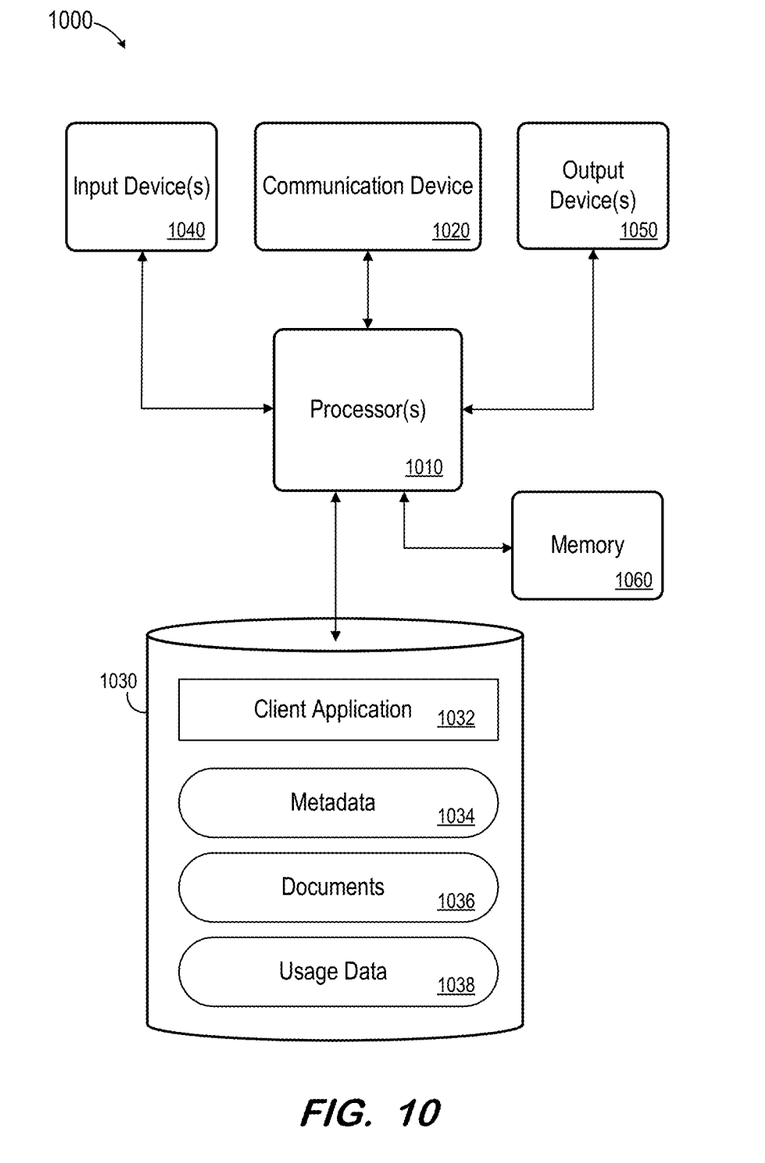
FIG. 10 is a block diagram of a computing system according to some embodiments.

FIG. 10 is a block diagram of computing system 1000 according to some embodiments. System 1000 may comprise a general-purpose computing apparatus and may execute program code to perform any of the functions described herein. System 1000 may comprise an implementation of client system 120 as described above. System 1000 may include other unshown elements according to some embodiments.

System 1000 includes processor(s) 1010 operatively coupled to communication device 1020, data storage device 1030, one or more input devices 1040, one or more output devices 1050 and memory 1060. Communication device 1020 may facilitate communication with external devices, such as a data server. Input device(s) 1040 may comprise, for example, a keyboard, a keypad, a mouse or other pointing device, a microphone, knob or a switch, an infra-red (IR) port, a docking station, and/or a touch screen. Input device(s) 1040 may be used, for example, to enter information into system 1000. Output device(s) 1050 may comprise, for example, a display (e.g., a display screen) a speaker, and/or a printer.

Data storage device 1030 may comprise any appropriate persistent storage device, including combinations of magnetic storage devices (e.g., magnetic tape, hard disk drives and flash memory), optical storage devices, Read Only Memory (ROM) devices, etc., while memory 1060 may comprise Random Access Memory (RAM), Storage Class Memory (SCM) or any other fast-access memory.

Client application 1032 may comprise program code executed by processor 1010 (and within the execution engine) to cause system 1000 to perform any one or more of the processes described herein. Embodiments are not limited to execution by a single apparatus. Metadata 1034 may comprise metadata of a dataset which is used to define visualizations according to some embodiments. Documents 1036 may include metadata defining visualizations and usage data 1038 may be used to determine associated dimensions and measures as described herein. Data storage device 1030 may also store data and other program code for providing additional functionality and/or which are necessary for operation of system 1000, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a display;
a memory storing processor-executable process steps of a client application; and
a processor to execute processor-executable process steps of the client application to:
receive a first user instruction to access a dataset stored in a data source;
retrieve metadata of the dataset from the data source, the metadata defining a plurality of dimensions and measures associated with the dataset;
receive a second user instruction to associate a first one of the plurality of dimensions and measures with a first visualization;
determine a first one or more dimensions or measures associated with the first one of the plurality of dimensions and measures;
retrieve, from the data source, data of the dataset associated with the determined first one or more dimensions or measures and the first one of the plurality of dimensions and measures;
update the first visualization based on the retrieved data;
display the updated first visualization on the display;
receive a third user instruction to save the first visualization in the memory;
in response to the third user instruction, store a document comprising visualization metadata in the memory, the visualization metadata defining the first visualization and indicating the dataset;
receive a fourth user instruction to open the document;
in response to the fourth user instruction, query the data source for second data from the dataset associated with the visualization metadata;
receive the second data;
update the first visualization based on the second data; and
display the first visualization updated based on the second data.

2. The system according to claim 1, wherein determination of the first one or more dimensions or measures comprises:
determination of the first one or more dimensions or measures based on usage data stored in the memory.

3. The system according to claim 2, the processor to further execute processor-executable process steps of the client application to:
update the usage data based on the second user instruction to associate the first one of the plurality of dimensions and measures with the first visualization.

4. The system according to claim 1, wherein determination of the first one or more dimensions or measures comprises:
determination of the first one or more dimensions or measures based a repository of column associations stored in the memory.

5. The system according to claim 1, the processor to further execute processor-executable process steps of the client application to:

receive a fifth user instruction to associate a second one of the plurality of dimensions and measures with the first visualization;

determine a second one or more dimensions or measures associated with the second one of the plurality of dimensions and measures;

retrieve, from the data source, third data of the dataset associated with the determined second one or more dimensions or measures and the second one of the plurality of dimensions and measures; and update the first visualization based on the retrieved third data; and display, on the display, the first visualization updated based on the retrieved third data.

6. The system according to claim 1, the processor to further execute processor-executable process steps of the client application to:

receive a sixth user instruction to modify the metadata of the dataset to define a calculated measure; and store the modified metadata of the dataset in the memory.

7. The system according to claim 6, the processor to further execute processor-executable process steps of the client application to:

receive a seventh user instruction to associate the calculated measure with the first visualization; and store the document including metadata defining the first visualization in the memory.

8. A computer-implemented method for a client application executing on a client device, the method comprising:

receiving a first user instruction to access a dataset stored in a data source;

retrieving metadata of the dataset from the data source in response to the first user instruction, the metadata defining a plurality of dimensions and measures associated with the dataset;

receiving a second user instruction to associate a first one of the plurality of dimensions and measures with a first visualization;

determining a first one or more dimensions or measures associated with the first one of the plurality of dimensions and measures;

retrieving, from the data source, data of the dataset associated with the determined first one or more dimensions or measures and the first one of the plurality of dimensions and measures;

updating the first visualization based on the retrieved data;

displaying the updated first visualization on a display;

receiving a third user instruction to save the first visualization in the memory;

in response to the third user instruction, storing a document comprising visualization metadata in the memory, the visualization metadata defining the first visualization and indicating the dataset;

receiving a fourth user instruction to open the document;

in response to the fourth user instruction, querying the data source for second data from the dataset associated with the visualization metadata;

receiving the second data; and displaying the first visualization updated with the second data.

9. The method according to claim 8, wherein determining the first one or more dimensions or measures comprises:

determining the first one or more dimensions or measures based on usage data stored in a memory.

10. The method according to claim 9, further comprising:

updating the usage data based on the second user instruction to associate the first one of the plurality of dimensions and measures with the first visualization.

11. The method according to claim 8, wherein determining the first one or more dimensions or measures comprises:

determining the first one or more dimensions or measures based a repository of column associations stored in a memory.

12. The method according to claim 8, further comprising:

receiving a fifth user instruction to associate a second one of the plurality of dimensions and measures with the first visualization;

determining a second one or more dimensions or measures associated with the second one of the plurality of dimensions and measures;

retrieving, from the data source, third data of the dataset associated with the determined second one or more dimensions or measures and the second one of the plurality of dimensions and measures; and updating the first visualization based on the retrieved third data; and displaying, on the display, the first visualization updated based on the retrieved third data.

13. The method according to claim 8, further comprising:

receiving a sixth user instruction to modify the metadata of the dataset to define a calculated measure; and storing the modified metadata of the dataset in a memory.

14. The method according to claim 13, further comprising:

receiving a seventh user instruction to associate the calculated measure with the first visualization; and storing the document including metadata defining the first visualization in a memory.

15. A non-transitory computer-readable medium storing computer-executable process steps which, when executed by a computing device, cause the computing device to:

receive a first user instruction to access a dataset stored in a data source;

retrieve metadata of the dataset from the data source in response to the first user instruction, the metadata defining a plurality of dimensions and measures associated with the dataset;

receive a second user instruction to associate a first one of the plurality of dimensions and measures with a first visualization;

determine a first one or more dimensions or measures associated with the first one of the plurality of dimensions and measures;

retrieve, from the data source, data of the dataset associated with the determined first one or more dimensions or measures and the first one of the plurality of dimensions and measures;

update the first visualization based on the retrieved data;

display the updated first visualization on a display;

receive a third user instruction to save the first visualization in a local memory;

in response to the third user instruction, store a document comprising visualization metadata in the memory, the visualization metadata defining the first visualization and indicating the dataset;

receive a fourth user instruction to open the document;

in response to the fourth user instruction, query the data source for second data from the dataset associated with the visualization metadata;

receive the second data; and display the first visualization updated with the second data.

16. The medium according to claim 15, the computer-executable process steps, when executed by a computing device, to further cause the computing device to:
- update the usage data based on the second user instruction to associate the first one of the plurality of dimensions and measures with the first visualization,
- wherein determination of the first one or more dimensions or measures comprises determination of the first one or more dimensions or measures based on usage data stored in a local memory.

17. The medium according to claim 15, the computer-executable process steps, when executed by a computing device, to further cause the computing device to:
- receive a fifth user instruction to associate a second one of the plurality of dimensions and measures with the first visualization;
- determine a second one or more dimensions or measures associated with the second one of the plurality of dimensions and measures;
- retrieve, from the data source, third data of the dataset associated with the determined second one or more dimensions or measures and the second one of the plurality of dimensions and measures; and
- update the first visualization based on the retrieved third data; and
- display, on the display, the first visualization updated based on the retrieved third data.

* * * * *